(12) United States Patent
Shor et al.

(10) Patent No.: US 12,198,718 B2
(45) Date of Patent: Jan. 14, 2025

(54) SELF-SUPERVISED SPEECH REPRESENTATIONS FOR FAKE AUDIO DETECTION

(71) Applicant: Google LLC, Mountain View, CA (US)

(72) Inventors: Joel Shor, Mountain View, CA (US); Alanna Foster Slocum, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/446,623

(22) Filed: Aug. 9, 2023

(65) Prior Publication Data

US 2023/0386506 A1  Nov. 30, 2023

Related U.S. Application Data

(63) Continuation of application No. 17/110,278, filed on Dec. 2, 2020, now Pat. No. 11,756,572.

(51) Int. Cl.
*G10L 25/69* (2013.01)
*G10L 15/02* (2006.01)
(Continued)

(52) U.S. Cl.
CPC .............. *G10L 25/69* (2013.01); *G10L 15/02* (2013.01); *G10L 15/063* (2013.01); *G10L 15/22* (2013.01)

(58) Field of Classification Search
None
See application file for complete search history.

(56) References Cited

U.S. PATENT DOCUMENTS 11,756,572 B2 * 9/2023 Shor ...................... G10L 15/22
704/243
2018/0254046 A1 9/2018 Khoury et al.
(Continued)

FOREIGN PATENT DOCUMENTS

WO  WO-2018160943 A1 * 9/2018 ............. G10L 17/00
WO  2019231624 A2  12/2019
(Continued)

OTHER PUBLICATIONS

Weicheng Cai, Haiwei Wu, Danwei Cai, Ming Li "The DKU Replay Detection System for the ASVspoof 2019 Challenge:On Data Augmentation, Feature Representation, Classification, and Fusion" arXiv:1907.02663v1 (Year: 2019).*

(Continued)

*Primary Examiner* — Richemond Dorvil
*Assistant Examiner* — Alexander G Marlow
(74) *Attorney, Agent, or Firm* — Honigman LLP; Brett A. Krueger; Grant Griffith

(57) ABSTRACT

A method for determining synthetic speech includes receiving audio data characterizing speech in audio data obtained by a user device. The method also includes generating, using a trained self-supervised model, a plurality of audio features vectors each representative of audio features of a portion of the audio data. The method also includes generating, using a shallow discriminator model, a score indicating a presence of synthetic speech in the audio data based on the corresponding audio features of each audio feature vector of the plurality of audio feature vectors. The method also includes determining whether the score satisfies a synthetic speech detection threshold. When the score satisfies the synthetic speech detection threshold, the method includes determining that the speech in the audio data obtained by the user device comprises synthetic speech.

22 Claims, 7 Drawing Sheets

(51) Int. Cl.
*G10L 15/06* (2013.01)
*G10L 15/22* (2006.01)

(56) References Cited

U.S. PATENT DOCUMENTS

2020/0090644 A1   3/2020   Klingler et al.
2020/0279568 A1*  9/2020   Vaquero Avilés-Casco ............... G10L 17/00
2020/0322377 A1  10/2020  Lakhdhar et al.

FOREIGN PATENT DOCUMENTS

WO   WO-2021075063 A1 *  4/2021  ........... G06N 3/0454
WO   WO-2021135454 A1 *  7/2021  ............ G10L 17/02

OTHER PUBLICATIONS

H. Muckenhirn, P. Korshunov, M. Magimai-Doss and S. Marcel, "Long-Term Spectral Statistics for Voice Presentation Attack Detection," in IEEE/ACM Transactions on Audio, Speech, and Language Processing, vol. 25, No. 11, pp. 2098-2111, Nov. 2017, doi: 10.1109/TASLP.2017.2743340 (Year: 2017).*

R. Reimao and V. Tzerpos, "FoR: A Dataset for Synthetic Speech Detection," 2019 International Conference on Speech Technology and Human-Computer Dialogue (SpeD), Timisoara, Romania, 2019, pp. 1-10, doi: 10.1109/SPED.2019.8906599 (Year: 2019).*

Mari Ganesh Kumar, Suvidha Rupesh Kumar, Saranya M, B. Bharathi, Hema A. Murthy "Spoof detection using time-delay shallow neural network and feature switching" arXiv:1904.07453v2 (Year: 2020).*

Synthetic Speech Detection using Fundamental Frequency Variation and Spectral Features, https://www.sciencedirect.com/science/a <https://www.sciencedirect.com/science/article/abs/pii/S0885230817301663> rticle/abs/pii/S0885230817301663 <https://www.sciencedirect.com/science/article/abs/pii/S0885230817301663>, Monisankha Pal, Dipjyoti Paul, Goutam Saha, Oct. 13, 2017.

One Deep Music Representation to Rule Them All? A Comparative Analysis of Different Representation Learning Strategies, https://link.springer.com/article/10.1007/s <https://link.springer.com/article/10.1007/s00521-019-04076-1>00521-019-04076-1 <https://link.springer.com/article/10.1007/s00521-019-04076-1>, Jaehun Kim, Julian Urbano, Cynthia C., S. Liem, Alan Hanjalic, 2020.

Automatic Identification of Gender from Speech, http://www.cs.columbia.edu/~sarah ita/papers/speech_prosody16.pdf <http://www.cs.columbia.edu/%7Esarahita/papers/speech_prosody16.pdf> Sarah Ita Levitan, Taniya Mishra, Srinivas Bangalore, Aug. 26, 2020.

Utterance-level Aggregation for Speaker Recognition in the Wild, http://www.robots.ox.ac.uk/~vgg/research/speakerID/, Weidi Xie, Arsha Nagrani, Joon Son Chung, Andrew Zisserman, Aug. 26, 2020.

ASVspoof 2019: Future Horizons in Spoofed and Fake Audio Detection <https://arxiv.org/pdf/1904.05441.pdf>).

Toward Learning a Universal Non-Semantic Representation of Speech, Cornel University, [Submitted on Feb. 25, 2020 (v1), last revised Aug. 6, 2020 (this version, v6)] <https://arxiv.org/abs/2002.12764>).

International Search Report for the related Application No. IDF-305093, Dated Aug. 8, 2020.

International Search Report and Written Opinion, related to Application No. PCT/US2021/059033, dated Feb. 16, 2022.

Haibin Wu et al., "Defense for Black-box Attacks on Anti-spoofing Models by Self-Supervised Learning", Dec. 7, 2020 arXIv, pp. 3780-3784. DOI: 10.21437/Interspeech.2020-2026.

Office Action issued in related Japanese Patent Application No. 2023-533746, dated Jul. 16, 2024.

* cited by examiner

SELF-SUPERVISED SPEECH REPRESENTATIONS FOR FAKE AUDIO DETECTION

CROSS-REFERENCE TO RELATED APPLICATIONS

This U.S. patent application is a continuation of, and claims priority under 35 U.S.C. § 120 from, U.S. patent application Ser. No. 17/110,278, filed on Dec. 2, 2020. The disclosure of this prior application is considered part of the disclosure of this application and is hereby incorporated by reference in its entirety.

TECHNICAL FIELD

This disclosure relates to self-supervised speech representations for fake or synthetic audio detection.

BACKGROUND

A speech-enabled environment (e.g., home, workplace, school, automobile, etc.) allows a user to speak a query or a command out loud to a computer-based system that fields and answers the query and/or performs a function based on the command. For example, the speech-enabled environment is implemented using a network of connected microphone devices distributed through various rooms or areas of the environment. As these environments become more ubiquitous and as speech recognition devices become more advanced, speech is increasingly used for important functions that include, for example, identification and authentication of the speaker. These functions greatly increase the need of ensuring that speech originates from a human and is not synthetic (i.e., digitally created or altered and played via a speaker).

SUMMARY

One aspect of the disclosure provides a method for classifying whether audio data includes synthetic speech. The method includes receiving, at data processing hardware, audio data characterizing speech in audio data obtained by a user device. The method also includes generating, by the data processing hardware, using a trained self-supervised model, a plurality of audio features vectors each representative of audio features of a portion of the audio data. The method also includes generating, by the data processing hardware, using a shallow discriminator model, a score indicating a presence of synthetic speech in the audio data based on the corresponding audio features of each audio feature vector of the plurality of audio feature vectors. The method also includes determining, by the data processing hardware, whether the score satisfies a synthetic speech detection threshold. The method also includes when the score satisfies the synthetic speech detection threshold, determining, by the data processing hardware, that the speech in the audio data obtained by the user device may include synthetic speech.

Implementations of the disclosure may include one or more of the following optional features. In some implementations, the shallow discriminator model includes an intelligent pooling layer. In some examples, the method further includes generating, by the data processing hardware, using the intelligent pooling layer of the shallow discriminator model, a single final audio feature vector based on each audio feature vector of the plurality of audio feature vectors. Generating the score indicating the presence of the synthetic speech in the audio data may be based on the single final audio feature vector.

Optionally, the single final audio feature vector includes an averaging of each audio feature vector of the plurality of audio feature vectors. Alternatively, the single final audio feature vector includes an aggregate of each audio feature vector of the plurality of audio feature vectors. The shallow discriminator model may include a fully-connected layer configured to receive, as input, the single final audio feature vector and generate, as output, the score.

In some implementations, the shallow discriminator model includes one of a logistic regression model, a linear discriminant analysis model, or a random forest model. In some examples, the trained self-supervised model is trained on a first training dataset including only training samples of human-originated speech. The shallow discriminator model may be trained on a second training dataset including training samples of synthetic speech. The second training dataset may be smaller than the first training dataset. Optionally, the data processing hardware resides on the user device. The trained self-supervised model may include a representation model derived from a larger trained self-supervised model.

Another aspect of the disclosure provides system for classifying whether audio data includes synthetic speech. The system includes data processing hardware and memory hardware in communication with the data processing hardware. The memory hardware stores instructions that when executed on the data processing hardware cause the data processing hardware to perform operations. The operations include receiving audio data characterizing speech in audio data obtained by a user device. The operations also include generating, using a trained self-supervised model, a plurality of audio features vectors each representative of audio features of a portion of the audio data. The operations also include generating, using a shallow discriminator model, a score indicating a presence of synthetic speech in the audio data based on the corresponding audio features of each audio feature vector of the plurality of audio feature vectors. The operations also include determining whether the score satisfies a synthetic speech detection threshold. The operations also include when the score satisfies the synthetic speech detection threshold, determining that the speech in the audio data obtained by the user device may include synthetic speech.

This aspect may include one or more of the following optional features. In some implementations, the shallow discriminator model includes an intelligent pooling layer. In some examples, the operations further include generating, using the intelligent pooling layer of the shallow discriminator model, a single final audio feature vector based on each audio feature vector of the plurality of audio feature vectors. Generating the score indicating the presence of the synthetic speech in the audio data may be based on the single final audio feature vector.

Optionally, the single final audio feature vector includes an averaging of each audio feature vector of the plurality of audio feature vectors. Alternatively, the single final audio feature vector includes an aggregate of each audio feature vector of the plurality of audio feature vectors. The shallow discriminator model may include a fully-connected layer configured to receive, as input, the single final audio feature vector and generate, as output, the score.

In some implementations, the shallow discriminator model includes one of a logistic regression model, a linear discriminant analysis model, or a random forest model. In some examples, the trained self-supervised model is trained on a first training dataset including only training samples of human-originated speech. The shallow discriminator model may be trained on a second training dataset including training samples of synthetic speech. The second training dataset may be smaller than the first training dataset. Optionally, the data processing hardware resides on the user device. The trained self-supervised model may include a representation model derived from a larger trained self-supervised model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
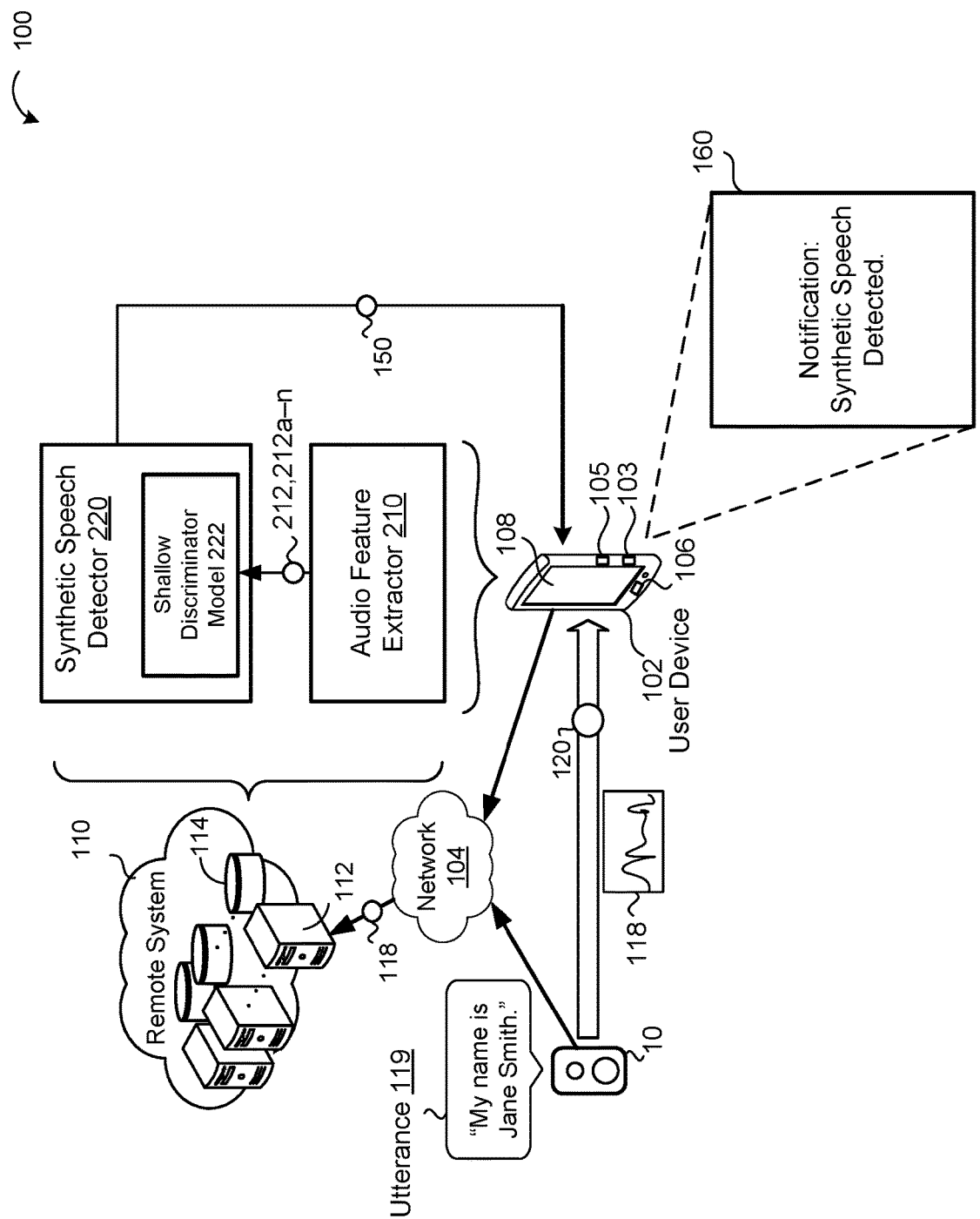
FIG. 1 is a schematic view of an example system for classifying audio data as synthetic speech.

As speech-enabled environments and devices become more common and sophisticated, reliance on using audio as a reliable indicator of human-originated speech is increasingly important. For example, speech biometrics is commonly used for speaker verification. Automatic speaker verification (ASV) is the authentication of individuals by performing analysis on speech utterances. However, with the advent of synthetic media (e.g., "deepfakes"), it is critically important for these systems to accurately determine when a speech utterance includes synthetic speech (i.e., computer-generated audio output that resembles human speech). For example, state of the art text-to-speech (TTS) and voice conversion (VC) systems can now closely mimic human speakers, which provide avenues to attack and deceive ASV systems.

In one example, an ASV system implementing a speaker verification model is used in conjunction with a hotword detection model so that an authorized user can invoke a speech-enabled device to wake-up and process subsequent spoken input from the user by speaking a predefined fixed phrase (e.g., a hotword, wake word, keyword, invocation phrase, etc.). In this example, the hotword detection model is configured to detect audio features characterizing the predefined fixed phrase in audio data and the speaker verification model is configured to verify that the audio features characterizing the predefined fixed phrase were spoken by the authorized user. Generally, the speaker verification model will extract a verification speaker embedding from the input audio features and compare the verification speaker embedding with a reference speaker embedding for the authorized user. Here, the reference speaker embedding can be previously obtained by having the particular user speaker the same predefined fixed phrase (e.g., during an enrollment process) and stored as part of a user profile for the authorized user. When the verification speaker embedding matches the reference speaker embedding, the hotword detected in the audio data is verified as being spoken by the authorized user to thereby permit the speech-enabled device to wake-up and process subsequent speech spoken by the authorized user. The aforementioned state-of-the art TTS and VC systems could be used to generate a synthesized speech representation of the predefined fixed phrase in the voice of the authorized user to spoof the speaker verification model into verifying that the synthesized speech representation was spoken by the authorized user.

Machine learning (ML) algorithms such as neural networks have primarily driven the surge of AVS systems and other speech-enabled technologies. However, these algorithms conventionally require vast amounts of training samples such that the primary bottleneck in training accurate models frequently rests on the lack of sufficiently large and high-quality datasets. For example, large datasets that include human-originated speech are readily available, but similar datasets that instead include synthetic speech are not. Thus, training a model that can accurately determine synthetic speech without conventional training sets poses a significant problem for the development of synthetic speech detection systems.

Implementations herein are directed toward detecting synthetic speech in audio data based on a self-supervised model that extracts audio features from the audio data and a shallow discriminator model that determines a probability that synthetic speech is present in the audio features and thus in the audio data. The self-supervised model may be trained exclusively on data containing human-originated speech and not synthetic speech, thus bypassing bottlenecks caused from lack of sufficient quantity of synthetic speech samples. Meanwhile, the shallow discriminator may be trained on a small quantity (relative to the self-supervised model) of training samples that include synthetic speech while still maintaining a high degree of accuracy.

Referring to FIG. 1, in some implementations, an example system 100 includes a user device 102. The user device 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 105. The user device 102 includes or is in communication with one or more microphones 106 for capturing utterances from an audio source 10. The audio source 10 may be a human producing human-originated utterances 119 or an audio device (e.g., a loudspeaker) that coverts electrical audio signals into corresponding utterances 119. A loudspeaker may be part of or in communication with any manner of computing or user device (e.g., a mobile phone, a computer, etc.).

The user device 102 includes an audio feature extractor 210 configured to extract audio features from audio data 120 characterizing speech obtained by the user device 102. For example, the audio data 120 is captured from streaming audio 118 by the user device 102. In other examples, the user device 102 generates the audio data 120. In some implementations, the audio feature extractor 210 includes a trained neural network (e.g., a memorialized neural network such as convolutional neural network) received from a remote system 110 via a network 104. The remote system 110 may be a single computer, multiple computers, or a distributed system (e.g., a cloud environment) having scalable/elastic computing resources 112 (e.g., data processing hardware) and/or storage resources 114 (e.g., memory hardware).

In some examples, the audio feature extractor 210 executing on the user device 102 is a self-supervised model. That is, the audio feature extractor 210 is trained using self-supervised learning (also referred to as "unsupervised learning") where labels are naturally part of the training sample and do not include separate external labels. More specifically, with self-supervised learning methods, models look for patterns in a data set without any pre-existing labels (i.e., annotation) and with minimal human supervision.

In the example shown, the audio source 10 produces an utterance 119 that includes the speech "My name is Jane Smith." The audio feature extractor 220 receives audio data 120 characterizing the utterance 119 in the streaming audio 118 and generates, from the audio data 120, a plurality of audio feature vectors 212, 212a—n. Each audio feature vector 212 represents audio features (i.e., audio characteristics such as spectrograms (e.g., mel-frequency spectrograms and mel-frequency ceptstral coefficients (MFCCs)) of a chunk or portion of the audio data 120 (i.e., a portion of the streaming audio 118 or utterance 119). For example, each audio feature vector represents features for a 960 millisecond portion of the audio data 120. The portions may overlap. For instance, the audio feature extractor 210 generates eight audio feature vectors 212 (each representing 960 milliseconds of the audio data 120) for five seconds of audio data 120. The audio feature vectors 212 from the audio feature extractor 210 capture a large number of acoustic properties of the audio data 120 based on the self-supervised learning.

After generating the audio feature vectors 212, the audio feature extractor 210 sends the audio feature vectors 212 to a synthetic speech detector 220 that includes a shallow discriminator model 222. As discussed in more detail below, the shallow discriminator model 222 is a shallow neural network (i.e., with little to no hidden layers) that generates, based on each of the audio feature vector 212, a score 224 (FIG. 2) that indicates a presence of synthetic speech in the streaming audio 118 based on the corresponding audio features of each audio feature vector 212. The synthetic speech detector 220 determines whether the score 224 (e.g., a probability score) satisfies a synthetic speech detection threshold. When the score 224 satisfies the synthetic speech detection threshold, the synthetic speech detector 220 determines that the speech (i.e., the utterance 119) in the streaming audio 118 captured by the user device 102 includes synthetic speech. The synthetic speech detector 220 may determine that the utterance 119 includes synthetic speech even when a majority of the utterance 119 includes human-originated speech (i.e., a small portion of synthetic speech is interjected or interspersed with human-originated speech).

In some implementations, the synthetic speech detector 220 generates an indication 150 to the user device 102 to indicate whether the streaming audio 118 includes synthetic speech based on whether the score 224 satisfies the synthetic speech detection threshold. For example, when the score 224 satisfies the synthetic speech detection threshold, the indication 150 indicates that the utterance 119 includes synthetic speech. In response, the user device 102 may generate a notification 160 to a user of the user device 102. For example, the user device 102 executes a graphical user interface (GUI) 108 for display on a screen of the user device 102 in communication with the data processing hardware 103. The user device 102 may render the notification 160 in the GUI 108. Here, the indication 150 indicates that the streaming audio 118 included synthetic speech by rendering the message "Notification: Synthetic Speech Detected" on the GUI 108. The provided notification 160 is exemplary only and the user device 102 may notify the user of the user device 102 with any other appropriate method. Additionally or alternatively, the synthetic speech detector 220 notifies other applications executing on the user device 102. For example, an application executing on the user device 102 authenticates the user of the user device 102 to allow the user to access one or more restricted resources. The application may use biometric speech to authenticate the user (e.g., via utterances 119). The synthetic speech detector 220 may provide the indication 150 to the application to alert the application that the utterance 119 included synthetic speech which may cause the application to deny authentication to the user. In another scenario, when an utterance 119 includes a hotword detected by the user device 102 in the streaming audio 118 to trigger the user device 102 to wake-up from a sleep state and initiate processing of subsequent speech, an indication 150 generated by the synthetic speech detector 220 indicating that the utterance 119 of the hotword includes synthetic speech can suppress the wake-up process on the user device 102.

The user device 102 may forward the indication 150 to the remote system 110 via the network 104. In some implementations, the remote system 110 executes the audio feature extractor 210 and/or the synthetic speech detector 220 instead of or in addition to the user device 102. For example, the user device 102 receives the streaming audio 118 and forwards the audio data 120 (or some characterization of the audio data 120) to the remote system for processing. The remote system 140 may include substantially more computational resources than user device 102. Additionally or alternatively, the remote system 140 may be more secure from potential adversaries. In this scenario, the remote system 110 may transmit the indication 150 to the user device 102. In some examples, the remote server 140 performs multiple authentication operations with the audio data 120 and returns a value indicating whether the authentication succeeded. In other implementations, the audio source 10 transmits the audio data 120 of the streaming audio 118 directly to the remote system 110 (e.g., via the network 104) without a separate user device 102 at all. For example, the remote system 110 executes an application that uses speech biometrics. In this case, the audio source 10 includes a device that directly transmits the audio data 120 to the remote system 110. For example, the audio source 10 is a computer that generates synthetic speech and transmits this synthetic speech (via the audio data 120) to the remote system 110 without the synthetic speech being verbalized.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 2:
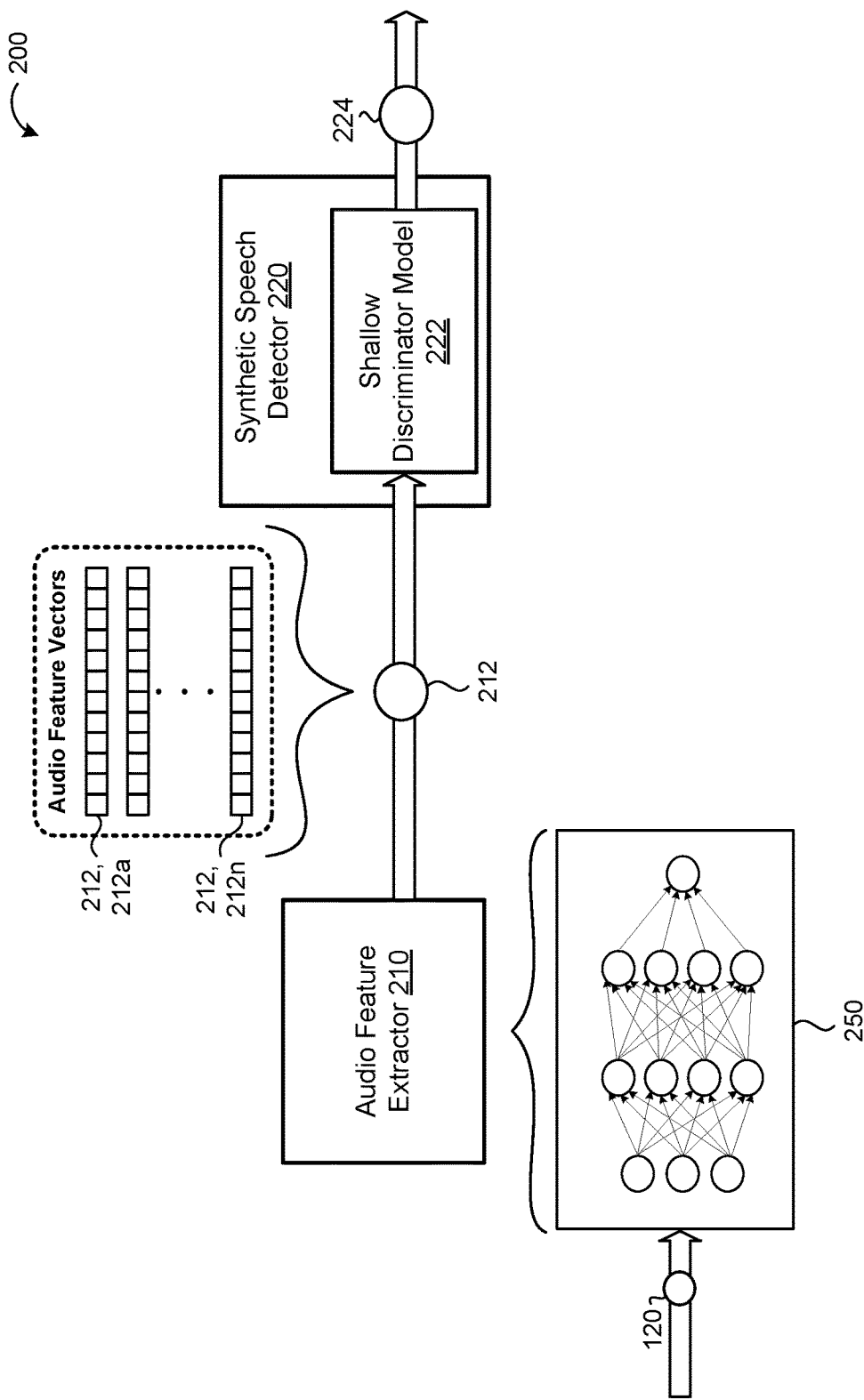
FIG. 2 is a schematic view of exemplary components of an audio feature extractor and synthetic speech detector.

Referring now to FIG. 2, schematic view 200 includes the audio feature extractor 210 executing a deep neural network 250. The deep neural network 250 may include any number of hidden layers that are configured to receive the audio data 120. In some implementations, the deep neural network 250 of the audio feature extractor 210 generates, from the audio data 120, the plurality of audio feature vectors 212, 212a—n (i.e., embeddings). The shallow discriminator model 222 receives the plurality of audio feature vectors 212 simultaneously, sequentially, or concatenated together. The plurality of audio feature vectors 212 may undergo some processing between the audio feature extractor 210 and the shallow discriminator model 222. The shallow discriminator model 222 may generate the score 224 based on the plurality of audio feature vectors 212 generated/extracted by the deep neural network 250 of the audio feature extractor 210.

Figure 3:
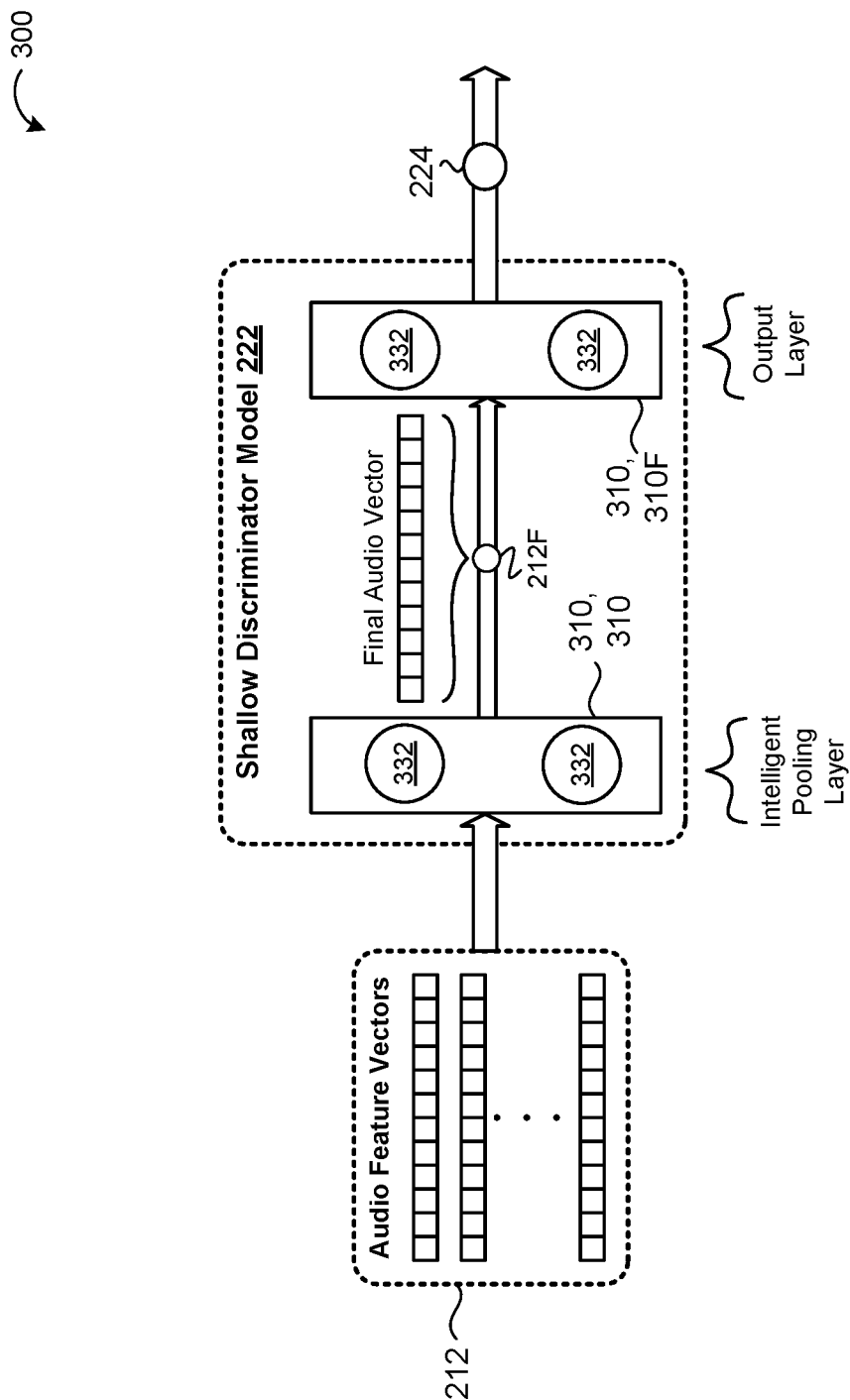
FIG. 3 is a schematic view of the synthetic speech detector of FIG. 2.

Referring now to the schematic view 300 of FIG. 3, in some examples, the shallow discriminator model 222 includes an intelligent pooling layer 310, 310P. The intelligent pooling layer 310P receives the plurality of audio feature vectors 212 and may generate a single final audio feature vector 212F based on each audio feature vector 212 received from the audio feature extractor 210. The shallow discriminator model 222 may generate the score 224 that indicates the presence of the synthetic speech in the streaming audio 118 based on the single final audio feature vector 212F. In some examples, the intelligent pooling layer 310P averages each audio feature vector 212 to generate the final audio feature vector 212F. In other examples, the intelligent pooling layer 310P aggregates each audio feature vector 212 to generate the final audio feature vector 212F. Ultimately, the intelligent pooling layer 310P in some manner distills the plurality of audio feature vectors 212 into the final audio feature vector 212F that includes or emphasizes the audio features that characterize human-originated speech versus synthetic speech. In some examples, the intelligent pooling layer 310P focuses the final audio feature vector 212F on a portion of the audio data 120 most likely to contain synthetic speech. For example, the audio data 120 includes a small or narrow portion that provides an indication (e.g., an audio characteristic) that the utterance 119 includes synthetic audio while the remaining portions of the audio data 120 provide little to no indication that the utterance 119 includes synthetic speech. In this example, the intelligent pooling layer 310P emphasizes the audio feature vector 212 associated with that portion of the audio data 120 (or otherwise deemphasizes the other remaining audio feature vectors 212).

In some implementations, the shallow discriminator model 222 includes only one other layer 310 in addition to the intelligent pooling layer 310P. For example, the shallow discriminator model 222 includes a fully-connected layer 310F that is configured to receive, as input, the single final audio feature vector 212F from the intelligent pooling layer 310P and generate, as output, the score 224. Thus, in some examples, the shallow discriminator model 222 is a shallow neural network that includes a single intelligent pooling layer 310P and only one other layer 310, e.g., the fully-connected layer 310F. Each layer includes any number of neurons/nodes 332. The single fully-connected layer 310F may map a result to a logit. In some examples, the shallow discriminator model 222 includes one of a logistic regression model, a linear discriminant analysis model, or a random forest model.

Figure 4A:
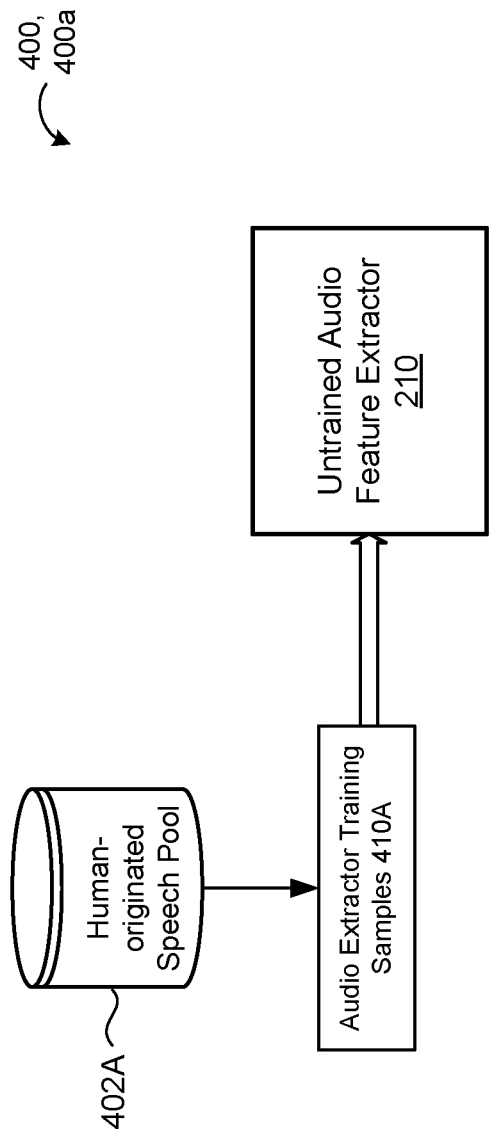
FIGS. 4A and 4B are schematic views of training architecture for the audio feature extractor and synthetic speech detector of FIG. 2.

Referring now to FIG. 4A, in some implementations, a training process 400, 400a trains the audio feature extractor 210 on a pool 402A of human-originated speech samples. These human-originated speech samples provide unlabeled audio extractor training samples 410A that train the untrained audio feature extractor 210. The human-originated speech pool 402A may be quite large leading to a significant number of audio extractor training samples 410A. Thus, in some examples, the training process 400a trains the untrained audio feature extractor 210 on a large quantity of audio extractor training samples 410A that only include human-originated speech and does not include any synthetic speech. This is advantageous, as large pools of synthetic speech typically are expensive and/or difficult to obtain. However, in some examples, the audio extractor training samples 410A include samples with human-originated speech and synthetic speech. Optionally, the audio feature extractor 210 includes a representation model derived from a larger trained self-supervised model. In this scenario, the larger trained self-supervised model may be a very large model that is computationally expensive to execute and not well-suited to user devices 102. However, due to potential advantages of executing the audio feature extractor 210 locally on the user device 102 (e.g., latency, privacy, bandwidth, etc.), the audio feature extractor 210 may be a representation model of the larger trained self-supervised model, which reduces the size and complexity of the model without sacrificing substantial accuracy. This allows the model to be executed on user devices 102 despite limited computational or memory capacity. Representation models improve performance by transforming high-dimensional data (e.g., audio) to a lower dimension to train small models and by using the representation model as pre-training.

Figure 4B:
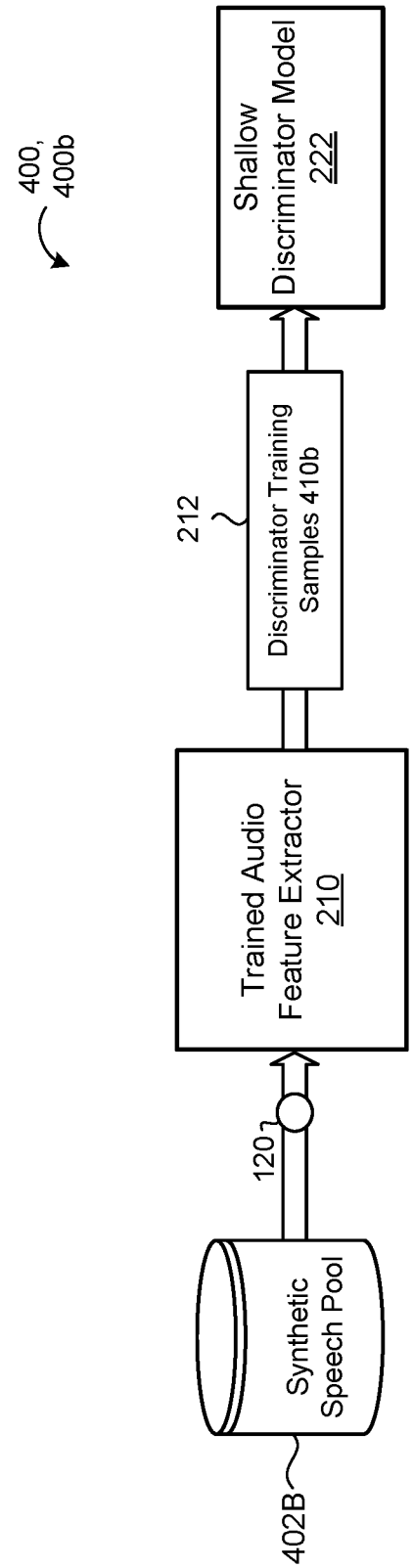

Referring now to FIG. 4B, in some examples, a training process 400, 400b trains the shallow discriminator model 222 subsequent to training the audio feature extractor 210. In this example, the trained audio feature extractor 210 receives audio data 120 from a pool 402B of synthetic speech samples. The trained audio feature extractor 210, based on the audio data 120 from the pool 402B, generates audio feature vectors 212 that represent discriminator training samples 410b. These discriminator training samples 410b (i.e., the plurality of audio feature vectors 212 generated by the trained audio feature extractor 210) trains the shallow discriminator model 222. While the shallow discriminator model 222 may be trained using synthetic speech from the synthetic speech pool 402B, the synthetic speech pool 402B may be substantially smaller than the human-originated speech pool 402A.

In some examples, the shallow discriminator model 222 is trained exclusively on training samples 410b that include synthetic speech while in other examples the shallow discriminator model 222 is trained on a mix of training samples 410b that include synthetic speech and training samples 410b that include purely human-originated speech. Samples 410b that include synthetic speech may include only synthetic speech (i.e., no human-originated speech). Samples 410b may also include a mix of synthetic speech and human-originated speech. For instance, in the example of FIG. 1, the utterance 119 includes the speech "My name is Jane Smith." A possible training sample 410b from this utterance 410b includes the "My name is" portion of the utterance 119 being human-originated speech while the "Jane Smith" portion of the utterance 119 being synthetic speech. The remote system 110 and/or user device 102 may perturb existing training samples 410b to generate additional training samples 410b. For example, the remote system replaces a portion of human-originated speech with synthetic speech, replace synthetic speech portions with human-originated speech portions, replace synthetic speech portions with different synthetic speech portions, and replace human-originated speech portions with different human-originated speech portions.

In some implementations, the remote system 110 executes the training processes 400a, 400b to train the audio feature extractor 210 and the shallow discriminator model 222 and then transmits the trained models 210, 222 to the user device 102. However, in other examples, the user device 102 executes the training processes 400a, 400b to train the audio feature extractor 210 and/or the shallow discriminator model 222 on the user device 102. In some examples, the remote system 110 or the user device 102 fine-tunes the shallow discriminator model 222 based on new or updated training samples 410b. For example, the user device 102 updates, fine-tunes, or partially retrains the shallow discriminator model 222 on audio data 120 received from the audio source 10.

Figure 5:
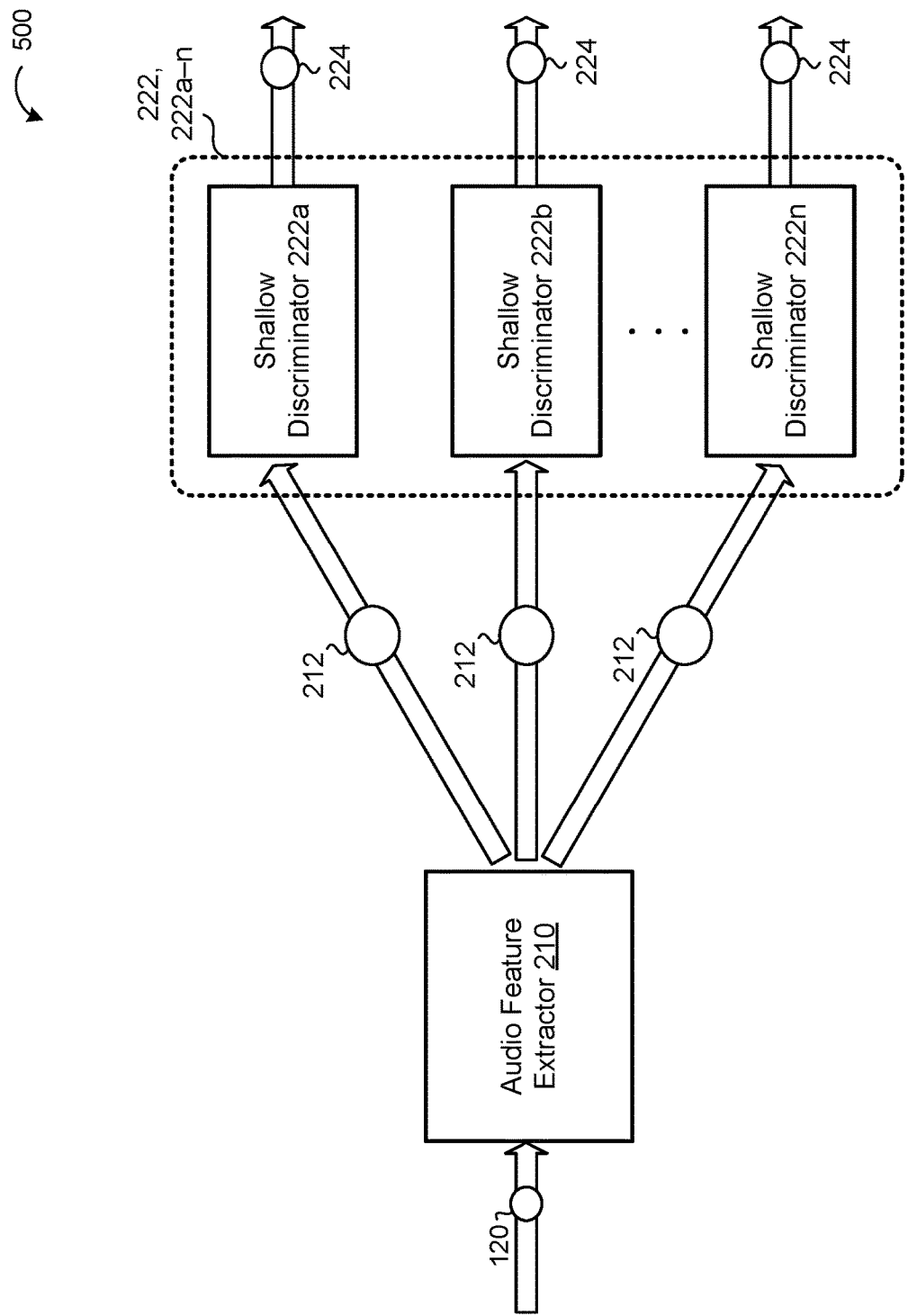
FIG. 5 is a schematic view of an audio feature extractor providing extracted audio features to a plurality of shallow discriminator models.

Referring now to the schematic view 500 of FIG. 5, in some examples, the user device 102 and/or the remote system 110 leverages the same audio feature extractor 210 to provide audio feature vectors 212 to multiple shallow discriminator models 222, 222a—n. In this manner, the audio feature extractor 210 acts as a "front-end" model while the shallow discriminator models 222 act as "back-end" models. Each shallow discriminator model 222 may be trained for different purposes. For example, a first shallow discriminator model 222a determines whether speech is human-originated or synthetic while a second shallow discriminator model 222b recognizes and/or classifies emotions within the streaming audio 118. That is, the self-supervised audio feature extractor 210 is well suited for "non-semantic" tasks (i.e., aspects of human speech other than meaning) that the shallow discriminator models 222 can take advantage of for a variety of different purposes. Due to the potentially small size and complexity of the shallow discriminator models 222, the user device may store and execute each of them as needed to process the audio feature vectors 212 generated by the audio feature extractor 210.

Figure 6:
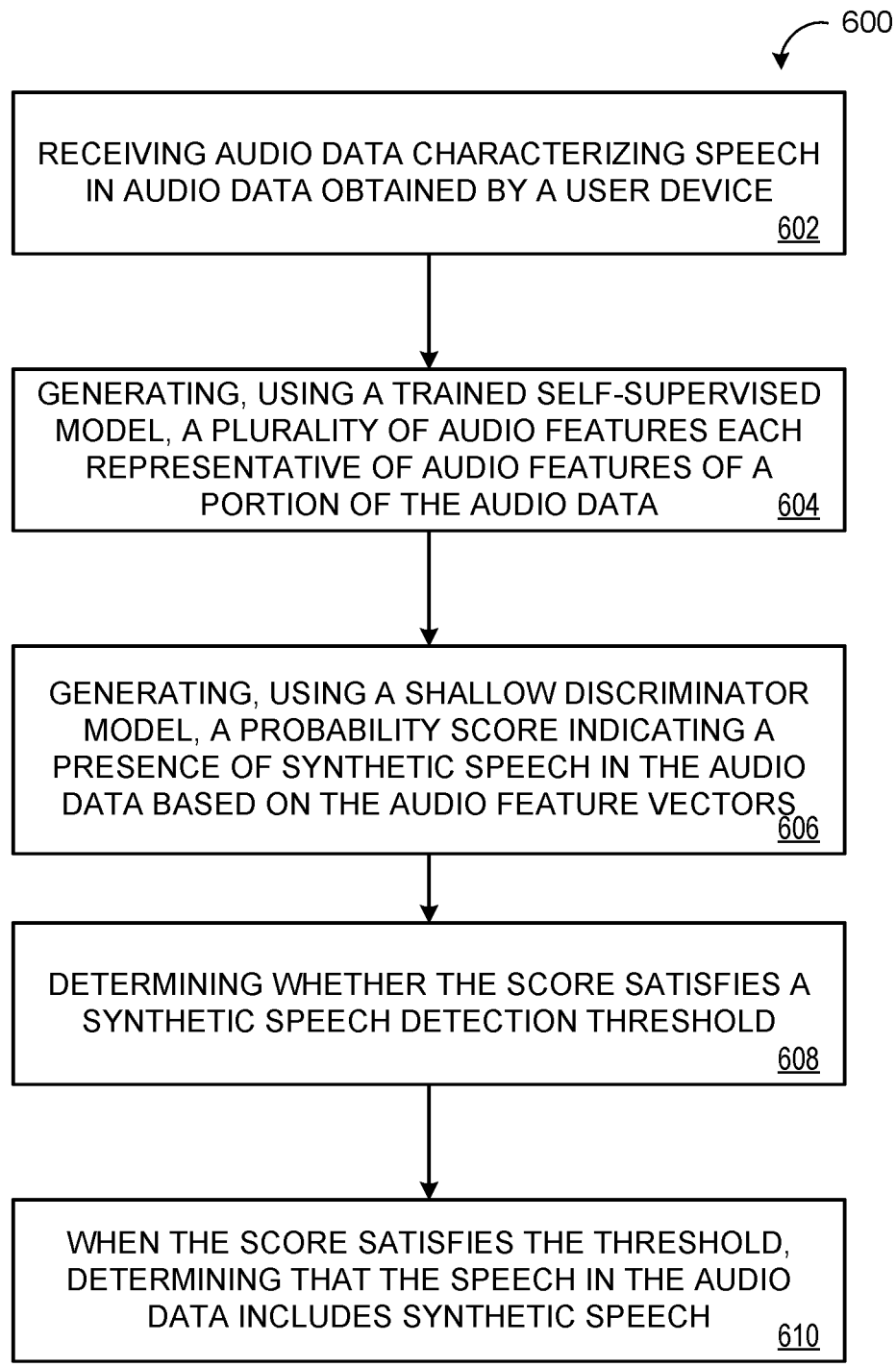
FIG. 6 is a flowchart of an example arrangement of operations for classifying audio data as synthetic speech.

FIG. 6 provides a flowchart of example operations for a method 600 of determining whether audio data 120 includes synthetic speech. At operation 602, the method 600 includes receiving, at data processing hardware 103, audio data 120 characterizing speech obtained by a user device 102. At operation 604, the method 600 includes generating, by the data processing hardware 103, using a trained self-supervised model 210 (i.e., the audio feature extractor 210), a plurality of audio features vectors 212 each representative of audio features of a portion of the audio data 120. The method 600, at operation 606, also includes generating, by the data processing hardware 103, using a shallow discriminator model 222, a score 224 indicating a presence of synthetic speech in the audio data 120 based on the corresponding audio features of each audio feature vector 212 of the plurality of audio feature vectors 212. The method 600, at operation 608, includes determining, by the data processing hardware 103, whether the score 224 satisfies a synthetic speech detection threshold and, at operation 610, when the score 224 satisfies the synthetic speech detection threshold, determining, by the data processing hardware 103, that the speech in the audio data 120 captured by the user device 102 comprises synthetic speech.

Figure 7:
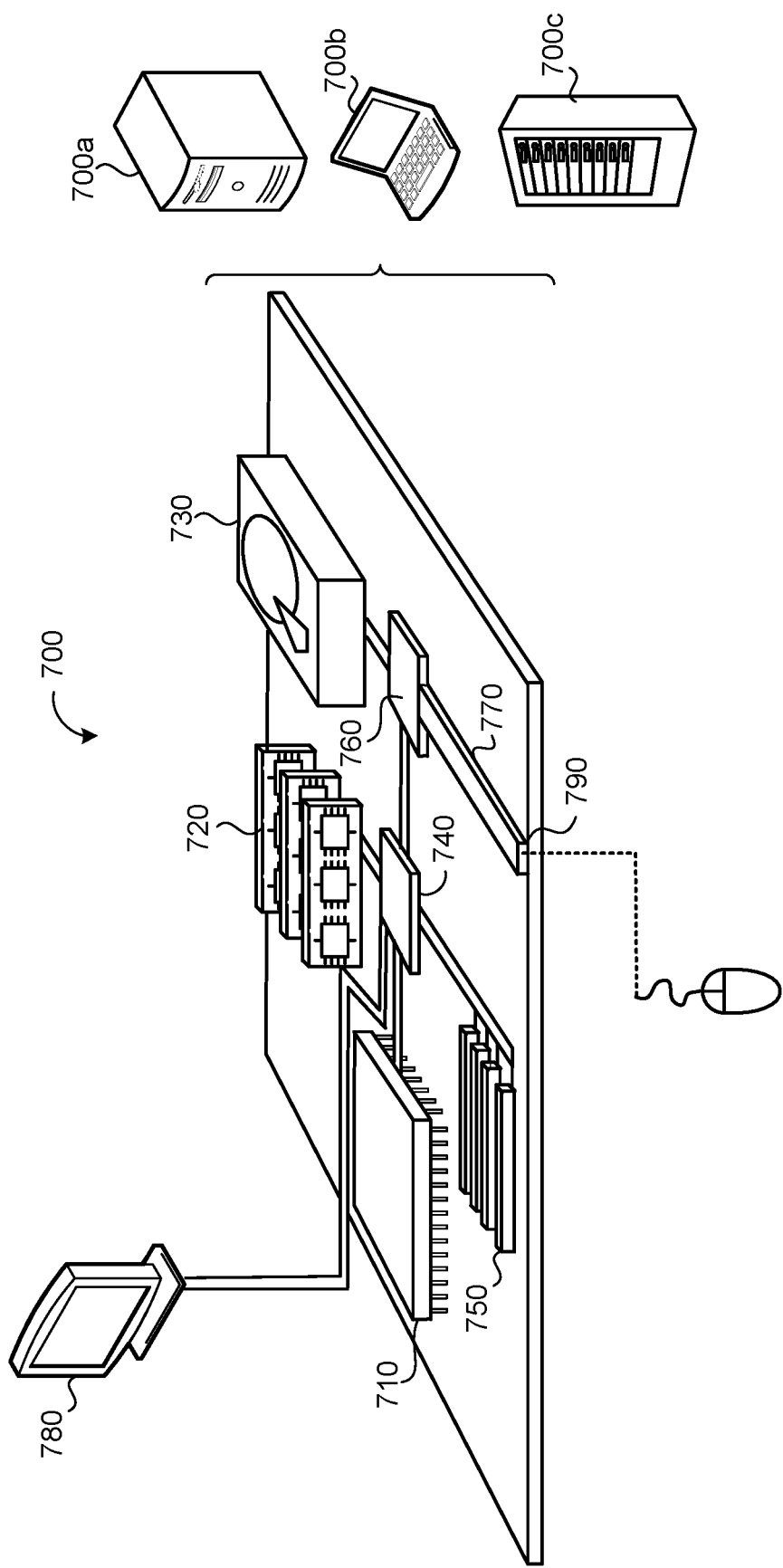
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
    receiving audio data characterizing speech obtained by a user device;
    generating, using a shallow discriminator model, a score indicating a presence of synthetic speech in the audio data; and
    based on determining that the score satisfies a synthetic speech detection threshold, determining that the speech in the audio data obtained by the user device comprises synthetic speech,
    wherein the shallow discriminator model is trained on a plurality of mixed training samples, each particular training sample of the plurality of mixed training samples comprising;
        a corresponding human-originated portion being first human-originated speech representing a first portion of a corresponding training utterance; and
        a corresponding synthetic speech portion being synthetic speech representing a second portion of the corresponding training utterance, the corresponding synthetic speech portion replacing second human-originated speech that represents the second portion of the corresponding training utterance for the particular training sample.

2. The computer-implemented method of claim 1, wherein the shallow discriminator model comprises an intelligent pooling layer.

3. The method of claim 2, wherein the intelligent pooling layer is configured to aggregate a plurality of embeddings of the audio data.

4. The computer-implemented method of claim 2, wherein the operations further comprise:
    generating, using the intelligent pooling layer of the shallow discriminator model, a single final audio feature vector based on the audio data, wherein generating the score indicating the presence of the synthetic speech in the audio data is based on the single final audio feature vector.

5. The computer-implemented method of claim 4, wherein the shallow discriminator model further comprises a single fully-connected layer.

6. The computer-implemented method of claim 5, wherein the single fully-connected layer is configured to receive, as input, the single final audio feature vector and generate, as output, the score.

7. The computer-implemented method of claim 1, wherein the shallow discriminator model comprises a logistic regression model.

8. The computer-implemented method of claim 1, wherein the shallow discriminator model comprises a linear discriminant analysis model.

9. The computer-implemented method of claim 1, wherein the shallow discriminator model comprises a random forest model.

10. The computer-implemented method of claim 1, wherein the data processing hardware resides on the user device.

11. The computer-implemented method of claim 1, wherein the shallow discriminator model comprises a single intelligent pooling layer and a single fully-connected layer.

12. A system comprising:
data processing hardware; and
memory hardware in communication with the data processing hardware, the memory hardware storing instructions that, when executed on the data processing hardware, cause the data processing hardware to perform operations comprising:
receiving audio data characterizing speech obtained by a user device;
generating, using a shallow discriminator model, a score indicating a presence of synthetic speech in the audio data; and
based on determining that the score satisfies a synthetic speech detection threshold, determining that the speech in the audio data obtained by the user device comprises synthetic speech,
wherein the shallow discriminator model is trained on a plurality of mixed training samples, each particular training sample of the plurality of mixed training samples comprising:
a corresponding human-originated portion being first human-originated speech representing a first portion of a corresponding training utterance; and
a corresponding synthetic speech portion being synthetic speech representing a second portion of the corresponding training utterance, the corresponding synthetic speech portion replacing second human-originated speech that represents the second portion of the corresponding training utterance for the particular training sample.

13. The system of claim 12, wherein the shallow discriminator model comprises an intelligent pooling layer.

14. The system of claim 13, wherein the intelligent pooling layer is configured to aggregate a plurality of embeddings of the audio data.

15. The system of claim 13, wherein the operations further comprise:
generating, using the intelligent pooling layer of the shallow discriminator model, a single final audio feature vector based on the audio data,
wherein generating the score indicating the presence of the synthetic speech in the audio data is based on the single final audio feature vector.

16. The system of claim 15, wherein the shallow discriminator model further comprises a single fully-connected layer.

17. The system of claim 16, wherein the single fully-connected layer is configured to receive, as input, the single final audio feature vector and generate, as output, the score.

18. The system of claim 12, wherein the shallow discriminator model comprises a logistic regression model.

19. The system of claim 12, wherein the shallow discriminator model comprises a linear discriminant analysis model.

20. The system of claim 12, wherein the shallow discriminator model comprises a random forest model.

21. The system of claim 12, wherein the data processing hardware resides on the user device.

22. The system of claim 12, wherein the shallow discriminator model comprises a single intelligent pooling layer and a single fully-connected layer.

* * * * *